Nov. 6, 1962

R. H. KOLB 3,062,052

APPARATUS FOR MEASURING VARIABLE PHYSICAL
CONDITIONS EMPLOYING A SENSING DEVICE
GENERATING A VARIABLE FREQUENCY SIGNAL

Filed April 28, 1958

INVENTOR:
R. H. KOLB
BY: *James Todorovic*
HIS ATTORNEY

INVENTOR:
R. H. KOLB
BY: James Jodrovic
HIS ATTORNEY

United States Patent Office 3,062,052
Patented Nov. 6, 1962

3,062,052
APPARATUS FOR MEASURING VARIABLE PHYSICAL CONDITIONS EMPLOYING A SENSING DEVICE GENERATING A VARIABLE FREQUENCY SIGNAL
Robert H. Kolb, Houston, Tex., assignor to Shell Oil Company, a corporation of Delaware
Filed Apr. 28, 1958, Ser. No. 731,328
8 Claims. (Cl. 73—398)

This invention pertains to telemetering systems which may be operated from a convenient location for measuring a condition in a substantially inaccessible location, such for example, as strain in production tubing, or pressure or temperature conditions in a borehole of an oil or gas well and the like.

In the operation of such systems it is the practice to employ at the substantially inaccessible location a condition responsive device for transmitting to conveniently located recording apparatus signals which are a measure of the condition.

For numerous practical reasons, the condition responsive device preferably employed in many cases is a type which transmits a measurement signal comprising an alternating electrical signal having a frequency which decreases for an increase in the value of the condition being measured. Thus, by determining the signal frequency a measurement may be obtained which is a function of the condition and which therefore must be converted into a direct measurement corresponding to the value of the condition before the measurement can be employed in a practical manner.

Heretofore, considerable time was required to determine the frequency of such a signal with simple instruments, and considerable skill was required to translate the frequencies into the corresponding values of the measured condition. Moreover, it was particularly impractical to make a frequency measurement where the signal was of a limited duration and a relatively low frequency. In addition, it is generally disadvantageous and prohibitively expensive to use the time of an expert for interpreting frequency measurement over a long period of time when it is desired to conduct an extended study of a condition, such, for example, as determining pressure or temperature variation in an oil well.

Accordingly, while a general object of this invention is to provide a new and improved apparatus for measuring physical conditions, a more particular object is to provide a new and improved telemetering system for automatically displaying and recording at a convenient location, a reading directly indicating the value of and expressed directly in the units of the condition measured at a substantially inaccessible location.

Another object is to provide such a direct reading system adapted for use with a condition responsive device of the type transmitting a measurement signal which decreases with an increase in the value of a condition being measured and may, in addition be of a limited duration and of a relatively low frequency.

Still another object is to provide such a system particularly adapted for recording and displaying, at the surface of the ground, the value of a subsurface condition, for example, the pressure or temperature in a borehole or oil well and the like.

Yet another object is to provide such a system for automatically measuring, displaying and recording the value of a measured condition at predetermined intervals over an extended period of time.

The above objects and additional advantages of this invention are obtained by utilizing the period of the measurement signal instead of measuring its frequency and the value of the condition under test is then determined by counting the number of cycles of a reference signal produced during the period. More particularly a predetermined number of cycles of the alternating signal which represents the condition under test are counted to give a period. The number of cycles of a reference frequency produced during this period will then indicate the value of the condition under test. If the counter is adjusted so that it operates in reverse to the direction of changes in the alternating signal and in addition is properly pre-set, the final reading will be an actual reading of the condition under test. Furthermore, if the frequency of the reference signal is chosen to correspond to the range of the alternating signal the final reading will also be in the proper units and not require further conversion.

The present invention will be understood from the following description taken with reference to the attached drawings, wherein.

While the present system may variously be employed as a telemetering system and may include any suitable type of transmitting device responsive to one of any number of physical conditions, the system is subsequently described for illustrative purposes as a telemetering system for measuring pressure variations in an oil well.

Figure 1:
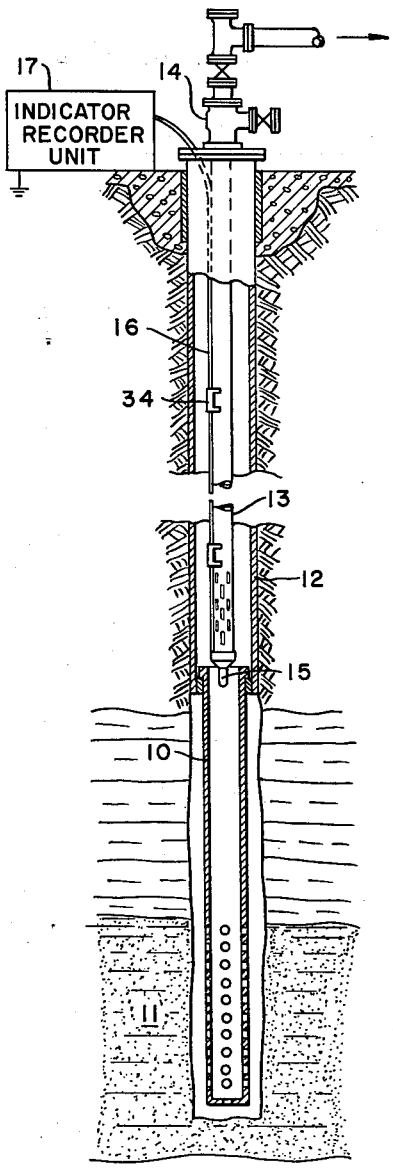
FIG. 1 is a diagrammatic view showing the system of the present invention arranged for measuring conditions in an oil well.

Referring now to FIG. 1 of the drawings, there is shown a producing well comprising the usual apparatus including a perforated liner 10 in the producing zone 11, the casing 12, the production tubing 13 and the well head 14. Where, for example, it is desired to display and record readings relating to the bottom hole pressure, a pressure responsive transmitter or device 15 is attached to the lower end of the production tubing 12 and is electrically connected, preferably by a single conductor cable 16, to suitable indicating and recording apparatus 17 conveniently located at the surface of the ground.

Figure 2:
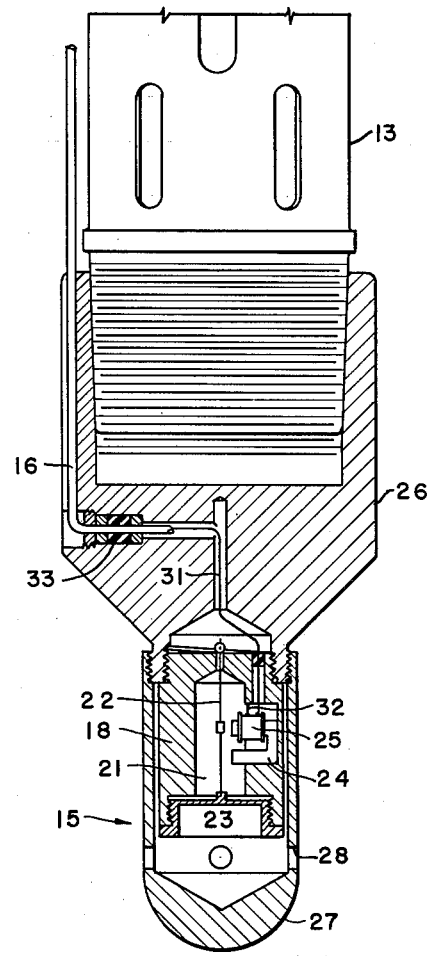
FIG. 2 is a view partially in vertical section of one embodiment of a condition responsive device which may be employed in the present system; and, FIG. 3 is a schematic diagram of a preferred embodiment of the system of the present invention.

FIG. 2 diagrammatically illustrates an embodiment of one type of pressure responsive transmitter 15 which may be employed in the apparatus of the present invention. More particularly, the transmitter comprises a holder 18 having an evacuated chamber 21 in which a tensioned wire 22 is arranged. One end of the wire is attached to an elastic steel diaphragm 23 which is threadably received by the holder 18. In a cavity of the holder 18 there is arranged a permanent magnet 24 having a multi-turn coil 25 thereon. At its upper end the holder 18 is threadably received in a fitting 26 which may, for example, be screwed onto the end of the perforated production tubing 13. A casing 27, having suitable pressure openings 28, is positioned around the holder 18 and is screwed onto the fitting 26 to protect the transmitter from mechanical damage. The transmitter is electrically connected to the surface apparatus 17 by the single conductor cable 16, the insulated conductor 31 of which is connected to one end of the coil 25 the other end of which is grounded as diagrammatically shown at 32. A pressure tight stuffing box 33 brings the cable to the outside of the production tubing 13 and any suitable clamp means 34 may be employed for attaching the cable to the tubing as shown in FIG. 1. The tension in the wire 22 varies with changes in the pressure external to the diaphragm 23. When a pulse is passed through the coil 25, the wire 22 is caused to vibrate at a frequency which decreases as the pressure affecting the diaphragm 23 increases. These vibrations induce an alternating current signal of the same frequency in the coil 25 which coil operates as a pick-up coil whereby the frequency signal is transmitted via the cable 16 to the surface apparatus.

While a transmitter producing a continuous frequency signal may be employed in the present system, the pulse energized type, as described, is preferred since it need not be in continuous operation when the system is employed for measuring pressure variation over long period of time.

In accordance with the present invention a readout expressed directly in pounds per square inch gauge (p.s.i.g.) is obtained by using the period of the measurement frequency signal as a measurement unit which of course is an indication of the pressure.

More particularly, the system of the present invention comprises a scaler which initiates and terminates an operating period consisting of the period of the measurement frequency signal multiplied by a constant, for example, 1000 to provide a magnified measurement signal period which may be readily employed with commercially available scalers and digital counters. Since the period of the measurement signal is a direct function of the pressure, a direct reading in p.s.i.g. can be obtained for any period of the measurement signal, by producing a time beat of a suitable frequency and counting the number of time beats produced during a time span consisting of the operating period (the period of the measurement signal multiplied by a constant) minus a time span equal to the period of the measurement signal at zero pressure multiplied by the same constant.

The frequency signal of transmitters of the type illustrated in FIG. 1 normally varies from 1,000 cycles per second (c.p.s.) at zero pressure to 750 c.p.s. at full scale pressure, regardless of the pressure range. The system of the present invention is subsequently described with a transmitter having such a frequency range and employed, for example, over a pressure range of from 0 to 1420 p.s.i.g.

Figure 3:
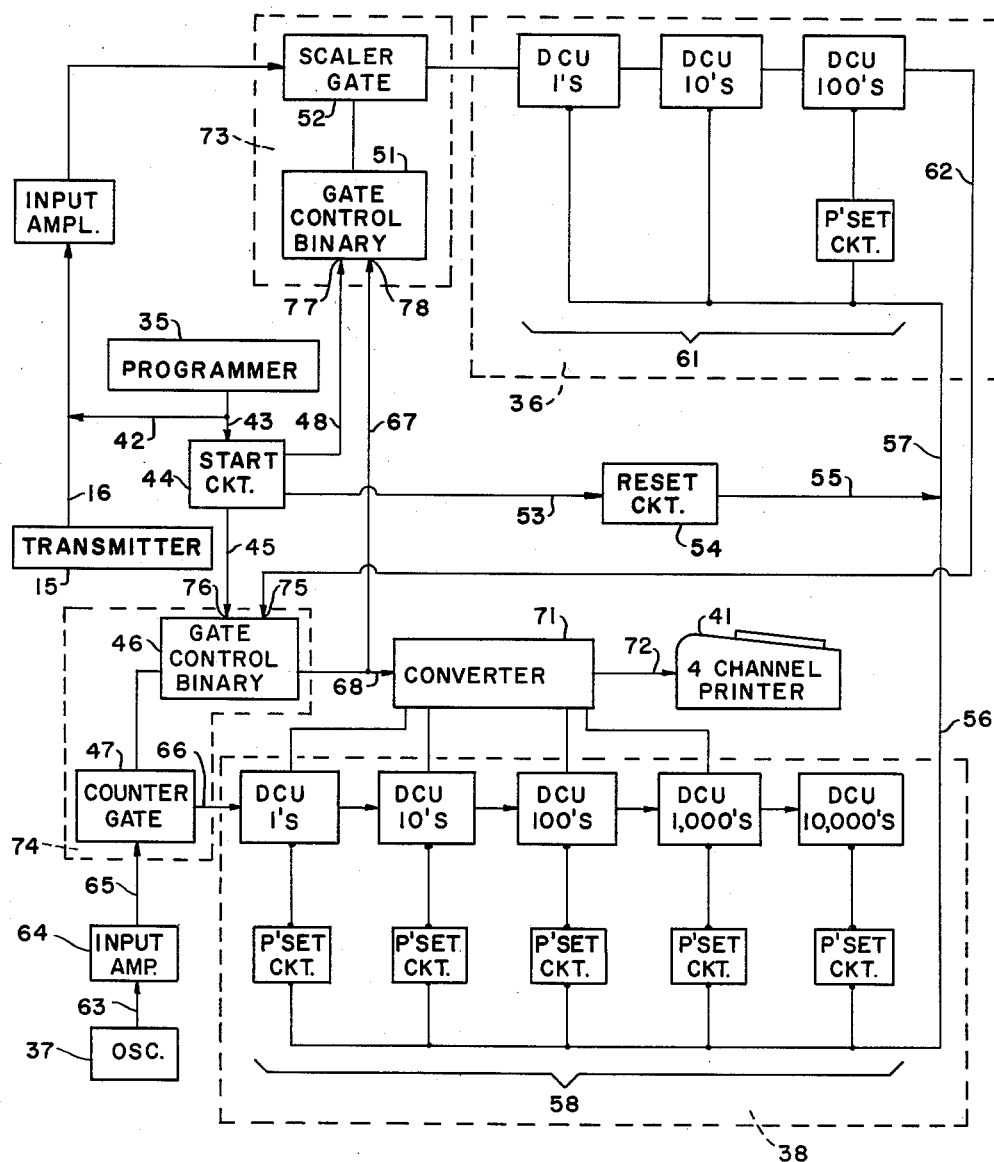

Referring now to FIG. 3 of the drawings the apparatus of the system comprises: a programmer 35 for automatically cycling the operation of the system when readings are taken intermittently over an extended period of time; a scaler 36 for determining the operating period; a source of oscillations 37 for producing a time beat; a digital counter 38 for counting the time beats; a printer 41 for recording the pressure readings displayed by the counter 38; and suitable control circuitry more fully described below.

In the preferred embodiment of the invention the operating period consists of the period of the measurement signal multiplied by 1,000. To this end the scaler 36 is a three decade scaler which is employed to count 1,000 cycles of the transmitter frequency signal for determining the operating signal period. From the foregoing it may be seen that at 0 p.s.i.g. a measurement frequency signal of 1,000 c.p.s. has an operating period of 1 second $$\left(\frac{1,000}{1,000}\right)$$

and at the maximum pressure of 1420 p.s.i.g., the frequency signal of 750 c.p.s. has an operating period of 1⅓ seconds $$\left(\frac{1,000}{750}\right)$$

A time span of ⅓ second is therefore equivalent to the pressure range of from 0 to 1420 p.s.i.g. The operating periods are substantially a direct function of the pressure, and the frequency of the time beat required to make the system direct reading in p.s.i.g. is the quotient of the maximum pressure divided by this time span $$\left(\frac{1420}{1/3}\right)$$

or 4260 c.p.s. Thus by counting the number of time beats produced during a time span (hereafter called the measurement time span) consisting of the operating period minus a time span of 1 second (the period of the measurement signal at zero pressure multiplied by 1,000), a direct reading in p.s.i.g. can be obtained. For example, the maximum pressure operating period is 1⅓ seconds and the measurement time span is ⅓ second. In operation of the system the counter 38 counts the number of time beats produced at 4260 c.p.s. during ⅓ second and displaying a reading of 1420 which equals the maximum pressure. Where, for example, the pressure in the well is equal to one half the maximum pressure of 710 p.s.i.g., it may be seen that the measurement time span is also one half of one third second or ⅙ second and at the end of the operating period, the counter counts 4260 c.p.s. for ⅙ second and displays a reading of 710.

The method in which the time span of 1 second is subtracted from the operating period to determine the measurement time span may be varied. In the preferred method of practicing the present invention, the subtraction is accomplished by applying the time beat frequency to the counter 38 throughout the operating period and pre-setting the counter so that it reads zero after counting the number of time beats (4260) equivalent to the period (1 second) of the measurement frequency signal at zero p.s.i.g. Thus it displays the actual pressure after counting time beats during the measurement time span of the remainder of the operating period.

Referring again to FIG. 3, it is understood the flowlines which illustrate the operation of the system also schematically represent the electric conductors which connect the components of the system and comprise part of the circuitry. In the following description the use of the term "conductor" in describing a flow-line is intended to include one or more conductors which may comprise the circuitry represented by the flow-line. In operation of the preferred embodiment of the system a readout cycle is commenced when the programmer 35 transmits a direct current pulse by a conductor 42 to the cable 16 and thus to the transmitter 15 for setting the wire 22 (FIG. 2) in vibration. A start pulse is derived from the direct current pulse by a conductor 43 and is transmitted to a start circuit 44 which simultaneously transmits three output pulses. A conductor 45 applies one pulse to the control binary 46 to ensure that the counter gate 47 is closed. A second pulse is applied by a conductor 48 to the control binary 51 to open the scaler gate 52 and the third pulse is applied by a conductor 53 to a re-set circuit 54 which then transmits a pulse via conductors 55 and 56 and 55 and 57 to pre-set circuits 58 and 61, respectively.

The counter decades are pre-set to display a zero reading at the end of the first second of the operating period. Thus in the embodiment of the present system the counter decades are pre-set to 95,740 whereby after the counter has counted 4260 time beats from the beginning of the operating period, it displays a reading of 00000.

The signal received from the transmitter 8 is a damped oscillation of limited amplitude and duration but having a high amplitude initial oscillation. This portion of the signal is discarded by pre-setting the third or hundreds decade of the scaler to an arbitrary figure such, for example, as 8, so that the scaler must count 200 cycles of the measurement signal frequency to bring itself to a count of zero, the 1's and 10's decades being pre-set at zero.

When the scaler gate 52 opens, the measurement signal frequency from the transmitter 15 is applied to the scaler. If the re-set action is not complete at the time the scaler gate opens, no significant counts are missed since the first counting of the scaler is insignificant, as noted above. When the third decade of the scaler flips from 9 to zero (and the scaler count is therefore 000), the scaler 36 transmits an output pulse (thus commencing the operating period) via the conductor 62 to the gate control binary 46 for opening the counter gate 47 and thereby applying the time beat to the counter 38 by means of a circuit including the oscillator 37, a conductor 63, an amplifier 64, a conductor 65, the counter gate 47, and finally a conductor 66. The scaler and the counter now simultaneously count cycles of the measurement signal frequency and time beats, respectively, until the scaler has counted 1,000 cycles of the signal frequency at which moment its third decade again flips from 9 to zero and transmits a second output pulse via the conductor 62 and to the gate control binary 46 for closing the counter gate 47 and terminating the operating period and at which time the counter displays a reading equal to the pressure surrounding the transmitter 15. When the gate control binary 46 flips to close the counter gate 47, the binary 46 simultaneously initiates a pulse which is transmitted by a conductor 67 to the gate control binary 51 and which is also transmitted by the conductor 67 and 68 to a converter 71. The pulse transmitted to the gate control binary causes the binary to flip and close the scaler gate 52. The pulse applied to the converter 71 causes the converter to initiate a printout action whereby a pulse is transmitted by a conductor 72 to the printer 41 which records the count display on the first 4 decades of the 5 decade counter 38.

If desired, the system of the present invention can be employed for displaying and recording pressure readings above a "datum" pressure. For example, if the operator is interested in determining and recording the variations and the pressure in the borehole above 710 p.s.i.g., the pre-set count on the counter is changed from 95,740 to 95,030 whereby after the commencement of the operating period 4,970 time beats (the number of time beats equivalent to a time span of 1⅙ seconds which is the period of the measurement signal frequency at 710 p.s.i.g.) must be counted by the counter before it displays a reading of 00,000. Thus the number of time beats counted during the remainder of the perior represent the amount by which the pressure in the borehole exceeds 710 p.s.i.g. From the foregoing it may be seen that by varying the pre-set count on the counter, the system may be adjusted to display pressure readings above any selected "datum" pressure falling within a span of zero to 1420 p.s.i.g.

Any suitable scaler 36 and counter 38 capable of functioning in the system may be employed as part of the apparatus disclosed in FIG. 3. The only requirement of the scaler being that it must provide pulses marking the start of an operating period, the period of the measurement signal equal to zero pressure and the end of the operating period. The counter can be any well known design which is capable of counting at the frequency used for the time beat and capable of being reset after each count to its preset value.

The circuitry of the programmer 35, the amplifiers 64 and input amplifier, the start circuit 44, the re-set circuit 54, and the gating circuits 73 and 74 may individually be of a conventional construction such as is well-known to those skilled in the art. The oscillator 37 may be of any well-known design which is provided with suitable means for varying its frequency. More particularly, the programmer is preferably of a type which may readily be adjusted for initiating readout cycles over a number of selected programs and during an extended period of time such as a period of several days or more. The system of the present invention thus comprises a fully automatic system which may readily be employed for displaying and recording pressure values in a borehole over extended periods of time. The gating circuits 73 and 74 are preferably two terminal bistable circuits of the type wherein a pulse applied to the terminals 75 and 77 of the gate control binaries 46 and 51, respectively (FIG. 3) operates to change the condition of the gate (that is to either open or close the gate), while a pulse applied to other terminals 76 and 78 of the gate control binaries 46 and 51, respectively (FIG. 3) operates to close the gate if it is open and otherwise has no effect on the gating of the system. Thus, in the system as previously described, the conductor 45 which transmits a pulse from the start circuit 44 for ensuring that the counter gate 47 is closed is connected to a terminal 76 of the gate control binary 46; the conduit 48 which transmits a pulse from the start circuit for opening the scaler gate 52 is connected to a terminal 77 of the control binary 51; and the conductor 62 which transmits pulses from the scaler 36 to open and close the counter gate 47 is connected to a terminal 75 of the control binary 46.

While the above explanation is based on the assumption that the frequency varies as a linear function it is substantially correct for the actual variation of the frequency over a range of sixty percent (60%) of full range. As is well-known the frequency of a vibrating string varies as the square root of the tension on the string. If the variation is assumed to be a straight line function for a range of forty to one hundred percent of the full range of the instrument the maximum deviation from a true pressure reading will only be one percent. This can be easily corrected by the use of a deviation table which provides the necessary corrections for the indicated pressures.

Although the system of the present invention is particularly adapted for use with a transmitter 15 which gives a frequency response which varies inversely as the pressure, the system may also be employed with a transmitter having a response which is a direct function of the pressure. This may be accomplished for example by pre-setting the counter controls so that the counter subtracts during the operating period instead of adding and then pre-setting the counter so that it displays a count of 05680 at the commencement of each operating period. Under the above conditions over the same frequency and pressure range as previously described, the measurement frequency signal will vary from 750 c.p.s. at 0 p.s.i.g. to 1,000 c.p.s. at 1420 p.s.i.g. The period of the measurement frequency signal at zero pressure is 1⅓ seconds and the period of the frequency at the maximum pressure is 1 second giving a measurement time span of ⅓ second as was previously the case. Thus, during the first second of the operating period, the counter counts 4,260 time beats and displays a reading of 01420. During the remainder of the operating period time beats will be subtracted therefrom until the termination of the operating period whereupon the counter displays a direct reading of the pressure in the borehole.

I claim as my invention:
1. A system for measuring over a predetermined range of values the value of a variable physical condition, said system comprising: a condition responsive device for transmitting a measurement signal having a frequency which varies in response to the value of the condition, first counting means for counting a predetermined number of cycles of said measurement signal, said first counting means in addition generating control pulses defining a first time period consisting of the predetermined number of said cycles counted, signal generating means producing a reference signal having a frequency directly proportional to the maximum value of the range divided by the difference in time between a time period determined by said predetermined number of cycles of the measurement signal corresponding to the maximum value of the range and a time period determined by said predetermined number of cycles of the measurement signal corresponding to the minimum value of the range, second count- ing means for counting cycles of said reference signal, and control means in said system responsive to said control pulses for causing the second counting means to count the number of cycles of the reference signal produced by the signal generating means during said first time period, said second counter means being preset back from zero the number of counts of the reference frequency that occur during the time interval required to count the predetermined number of cycles of the measurement frequency corresponding to the minimum value of the condition.

2. A system for measuring pressure values over a predetermined pressure range comprising: a pressure responsive device for generating an alternating signal whose frequency decreases as the pressure increases, first counting means for counting a predetermined number of cycles of said alternating signal, said first counting means in addition generating first and second control pulses defining a first time period substantially equal to the time required to count a predetermined number of the cycles of said alternating signal, signal generating means for producing a reference signal, the frequency of said reference signal being proportional to the maximum pressure to be determined divided by the difference in time between a second time period equal to the time required to count said predetermined number of cycles of said alternating signal corresponding to the maximum pressure and a third time period equal to the time required to count said predetermined number of cycles of said alternating signal corresponding to zero pressure, second counting means for counting cycles of said reference signal, and control means in said system responsive to said first and second control pulses for causing the second counting means to count the number of cycles of the reference signal produced by the signal generating means during said first time period, said second counter means being preset back from zero the number of counts of the reference frequency that occur during said third time interval.

3. A system for measuring over a predetermined range of values the value of a variable physical condition comprising: a condition responsive device for transmitting a measurement signal having a frequency proportional to the value of the condition, first counting means for counting a predetermined number of cycles of said measurement signal, said first counting means in addition generating first and second control pulses defining a first time period consisting of the predetermined number of said cycles counted, signal generating means producing a reference signal having a frequency directly proportional to the maximum value of the range divided by the difference in time between a time period determined by said predetermined number of cycles of the measurement signal corresponding to the maximum value of the range and a time period determined by said predetermined number of cycles of the measurement signal corresponding to the minimum value of the range, second counting means for counting cycles of said reference signal, gating means connected between said signal generating means and the second counting means, and means connecting said first and second control pulses to said gating means to open said gating means in response to said first control pulse and close it in response to the second control pulse, said second counter means being preset back from zero the number of counts of the reference frequency that occur during the time interval required to count the predetermined number of cycles of the measurement frequency corresponding to the minimum value of the condition.

4. A system for measuring the value of a variable condition over a predetermined range comprising: a device responsive to the condition for generating a measurement signal having a frequency which decreases as the value of the condition increases, means for generating a first pulse, a first counting means actuated by said first pulse for counting after a predetermined interval a predetermined number of cycles of said measurement signal and producing second and third pulses defining a first time period consisting of the predetermined number of said cycles counted, signal generating means producing a reference signal having a frequency directly proportional to the maximum value of the range divided by the difference in time between a second time period consisting of said predetermined number of cycles of the measurement signal proportional to the maximum value of the range and a third time period consisting of said predetermined number of cycles of the measurement signal proportional to the minimum value of the range, a second counting means, means actuated by said second pulse for starting transmission of said reference signal to said second counting means, and means actuated by said third pulse for stopping said transmission of the reference signal, said second counting means being preset back from zero the number of counts of the reference frequency that occur during said third time interval.

5. A system for measuring pressure values over a predetermined pressure range comprising: a pulse energized pressure responsive device for generating a measurement signal of a limited duration and having a frequency which decreases as the pressure increases, means for generating and transmitting to said pressure responsive device a first pulse for energizing the device, first counting means actuated by said first pulse for counting after a predetermined interval a predetermined number of cycles of said measurement signal and producing second and third pulses defining a first time period consisting of the predetermined number of said cycles counted, signal generating means producing a reference signal having a frequency equal numerically to the maximum value of the pressure range divided by the difference in time between a second time period equal to the time required to count said predetermined number of cycles of the measurement signal corresponding to the maximum pressure of the range and a third time period equal to the time required to count said predetermined number of cycles of the meaurement signal corresponding to the minimum pressure of the range, a second counter, means actuated by said second pulse for starting transmission of said reference signal to said second counter, means actuated by said third pulse for stopping said transmission of the reference signal, and means also actuated by said first pulse for presetting the second counter to a predetermined count whereby the second counter is caused to count from zero after the transmission of the number of cycles of the reference signal equal to said third time period.

6. A system for measuring pressure values over a predetermined pressure range comprising: a pulse energized pressure responsive device for generating a measurement signal of a limited duration and having a frequency which decreases as the pressure increases, means for generating and transmitting to said pressure responsive device a first pulse for energizing the device, a means actuated by said first pulse including a first counter for counting after a predetermined interval a predetermined number of cycles of said measurement signal, said means producing second and third pulses defining a first time period consisting of the predetermined number of said cycles counted, signal generating means producing a reference signal having a frequency equal numerically to the maximum value of the pressure range divided by the difference in time between a second time period equal to the time required to count the predetermined number of cycles of the measurement signal corresponding to the maximum pressure of the range and a third time period equal to the time required to count the predetermined number of cycles of the measurement signal corresponding to the minimum pressure of the range, a second counter, means actuated by said second pulse for starting transmission of said reference signal to said second counter, means actuated by said third pulse for stopping said transmission of the reference signal, means actuated by said first pulse for presetting the second counter to a predetermined count whereby said counter is caused to count from zero after the transmission of the number of cycles of the reference signal equal to said third time period, and means also actuated by said first pulse for presetting the first counter to a predetermined count whereby the counter is caused to count from zero after said predetermined interval.

7. The system of claim 6 wherein the means actuated by said first pulse comprises a start circuit connected to produce a start pulse in response to said first pulse, and a gate connected between the first counter and the pressure responsive device and controlled to be opened by said start pulse to start transmission of said measurement signal to said first counter and controlled to be closed in response to said third pulse for stopping transmission of said measurement signal.

8. The system of claim 7 wherein the means for generating said first pulse includes a programmer for generating the first pulse intermittently for operating the system through a cycle according to a predetermined program, and recording means in said system for recording the count on the second counter at the end of each cycle.

References Cited in the file of this patent
UNITED STATES PATENTS

| | | |
|---|---|---|
| 2,651,204 | Dickinson | Sept. 8, 1953 |
| 2,750,796 | Knoll et al. | June 19, 1956 |
| 2,926,247 | Palmer | Feb. 23, 1960 |